Dec. 11, 1945.   F. W. HILL   2,390,533
MACHINE FOR THREADING AND CUTTING TUBULAR ARTICLES
Filed Oct. 29, 1941   10 Sheets-Sheet 5

INVENTOR.
FREDERICK W. HILL.
BY Ward, Crosby & Neal
ATTORNEYS

Patented Dec. 11, 1945

2,390,533

UNITED STATES PATENT OFFICE 2,390,533

MACHINE FOR THREADING AND CUTTING TUBULAR ARTICLES

Frederick W. Hill, Rutherford, N. J., assignor to General Printing Ink Corporation, New York, N. Y., a corporation of Delaware Application October 29, 1941, Serial No. 416,977

9 Claims. (Cl. 18—1)

My invention relates to a machine for threading and cutting tubular articles.

My invention has further reference to a pair of Geneva movement mechanisms, or equivalent, by which, first step-by-step movement is imparted to a disk carrying a plurality of article-supporting spindles and, second, rotary movement is imparted to all of the spindles while the disk remains stationary.

My invention relates further to a machine comprising a plurality of spindles movable step-by-step to an article-loading position, a threading position, a cutting position and then successively to two positions wherein the severed or cut parts of the article are removed from the supporting spindle therefor.

My invention relates further to a novel magazine arrangement for supporting a plurality of tubular articles which, individually, are removed from the magazine and automatically positioned on a supporting spindle for subsequent action thereon of a threading die, a cutting tool and other instrumentalities if desired.

My invention relates further to novel mechanism for stripping or removing separate parts of a tubular article from a supporting spindle therefor.

Various other objects, advantages and features of my invention will become apparent from the following detailed description.

My invention resides in the machine for threading and cutting tubular articles, and in the novel combinations and arrangements of the character hereinafter described and claimed.

For an understanding of my invention and for an illustration of one of the forms thereof, reference is to be had to the accompanying drawings, in which.

Figure 1:
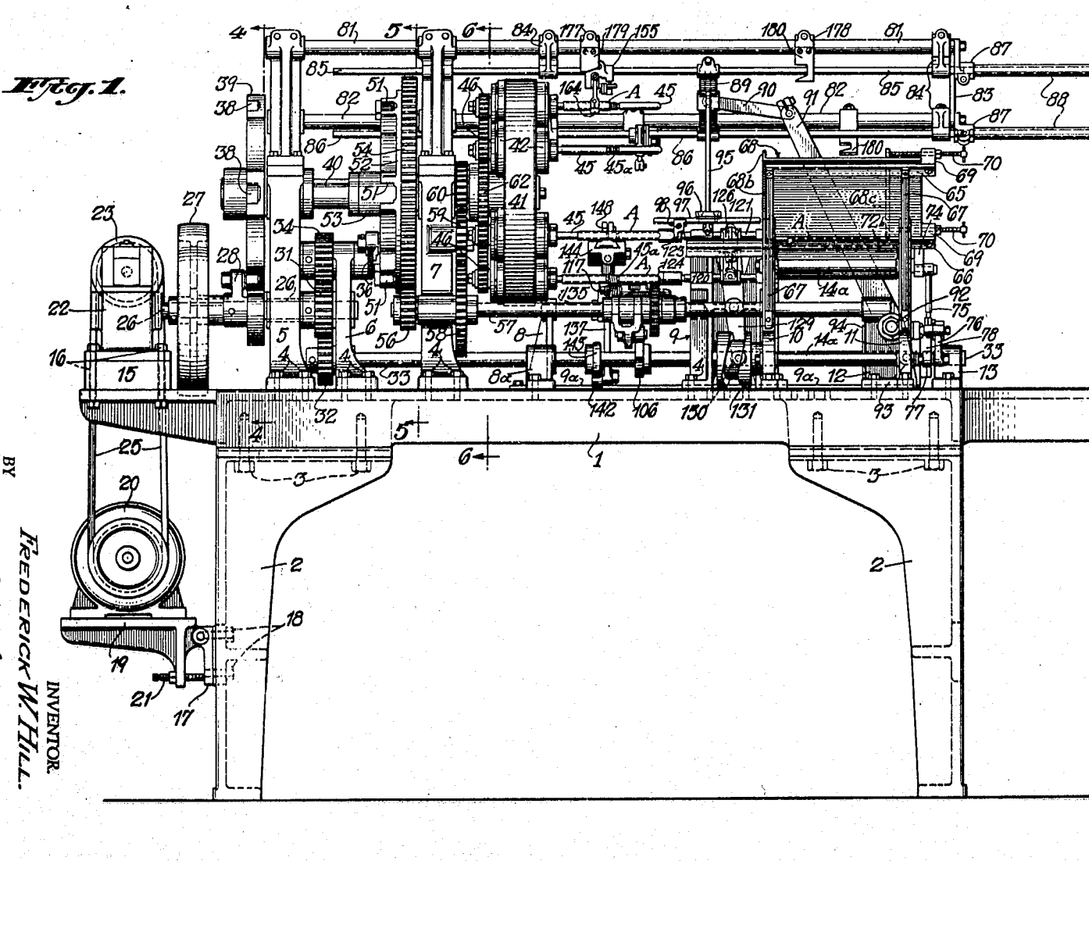
Figure 1 is a front elevational view showing the machine of my invention.

Referring to Fig. 1, a table or supporting member 1 is shown as maintained in horizontal position by a pair of standards 2, 2 each of which comprises a pair of spaced foot sections adapted to rest upon a suitable supporting surface. As illustrated, the table 1 and standards 2, 2 are secured together by screws 3.

As shown in Figs. 1-6 inclusive and 16, the table 1, by screws 4, has secured thereto a plurality of vertical standards 5, 6, 7, 8, 8a, 9, 10, 11, 12 and 13.

Figure 16:
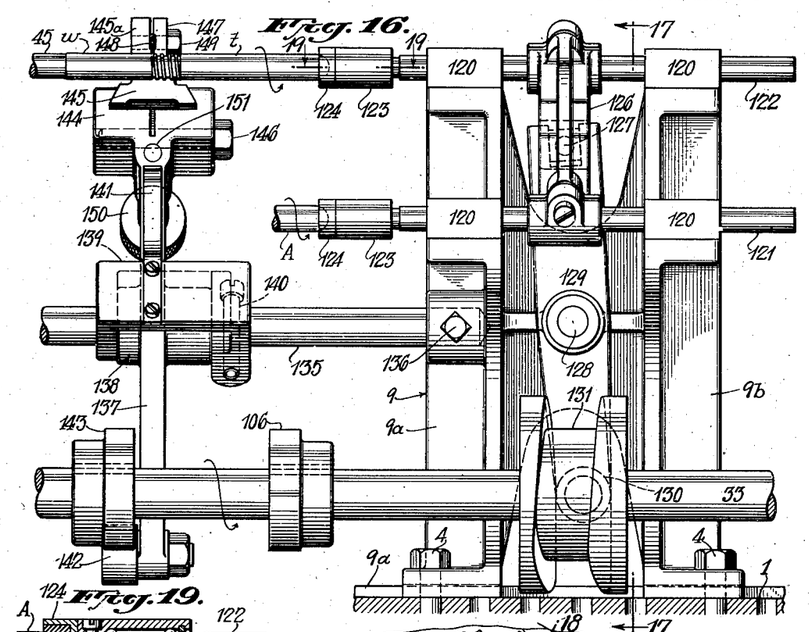
Fig. 16 is an enlarged, front elevational view, partly in section, showing part of the mechanism of my invention.

The standard 9, as shown in Fig. 16, comprises two vertical spaced sections 9a and 9b which, preferably, are formed from a single casting. The standards 10 and 11 are connected to each other by bolts 14, Fig. 7, and spacing sleeves 14a, Fig. 1. In addition, the table 1, at the left thereof, Fig. 1, has a block 15 secured to its upper surface by bolts 16.

Referring to Fig. 1, the standard 2 toward the left is shown as having a member 17 secured thereto by screws 18. Pivoted to the member 17 is a support 19 which carries a suitable electrical motor 20, the support 19 comprising a depending section through which is threaded a screw 21 for coaction with the member 17.

The block 16 described above carries a gear box 22 having associated therewith a pulley 23 disposed in the same vertical plane with a pulley 24 secured to the armature shaft of the motor 20. An endless belt 25 coacts with the pulleys 23 and 24 whereby power is transmitted to said pulley 23. As will be obvious, the belt 25 may be tightened or loosened as desired by adjustment of the screw 21.

Extending from the gear box 22 is a horizontal shaft 26 which is journalled in the aforesaid standards 5 and 6. The shaft 26 carries a fly wheel 27 and, immediately adjacent thereto, said shaft 26 has secured thereto a crank arm 28 which carries a roller 29 at its free end, the crank arm hub comprising an arcuate member 28a disposed opposite the crank arm 28, Fig. 4.

Figure 2:
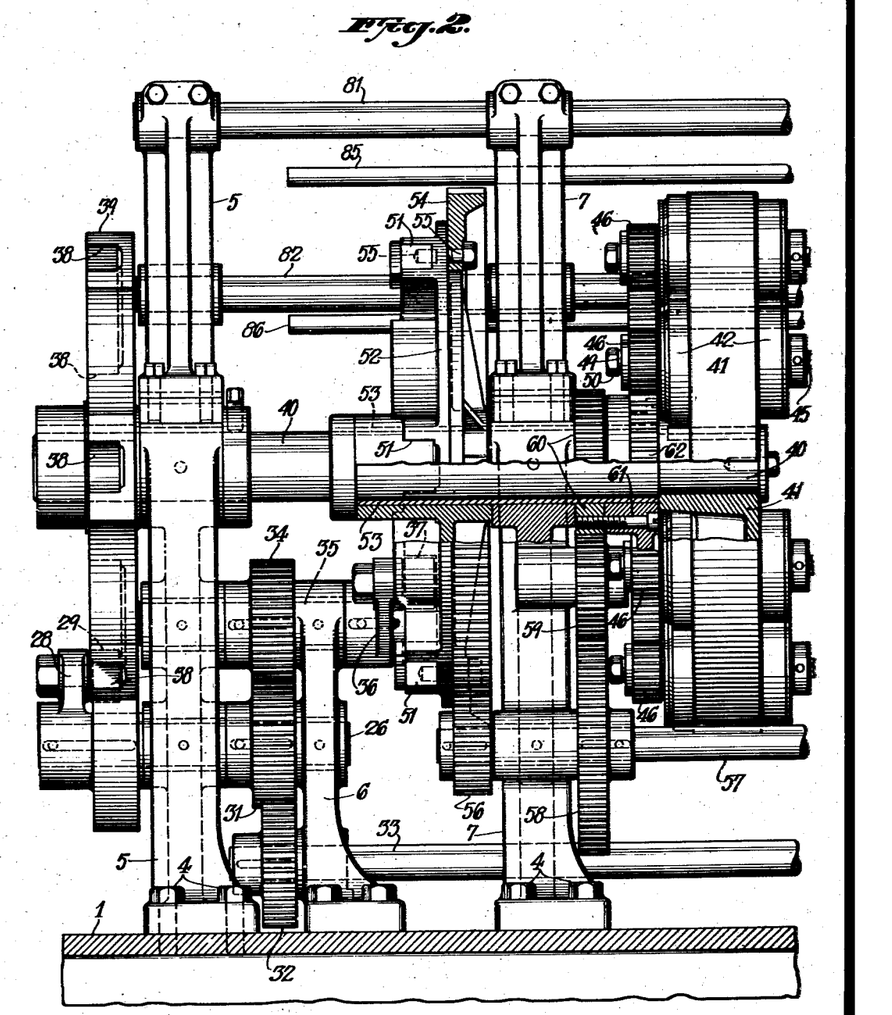
Figs. 2 and 3 are enlarged elevational views, partly broken away and partly in section, showing the machine illustrated in Fig. 1.

Between the standards 5 and 6, Fig. 2, the shaft 26 has secured thereto a gear wheel 31 which meshes with a gear wheel 32 secured to one end of a horizontal cam shaft 33 journalled in the standards 6, 8a and 13, Fig. 1.

Figure 5:
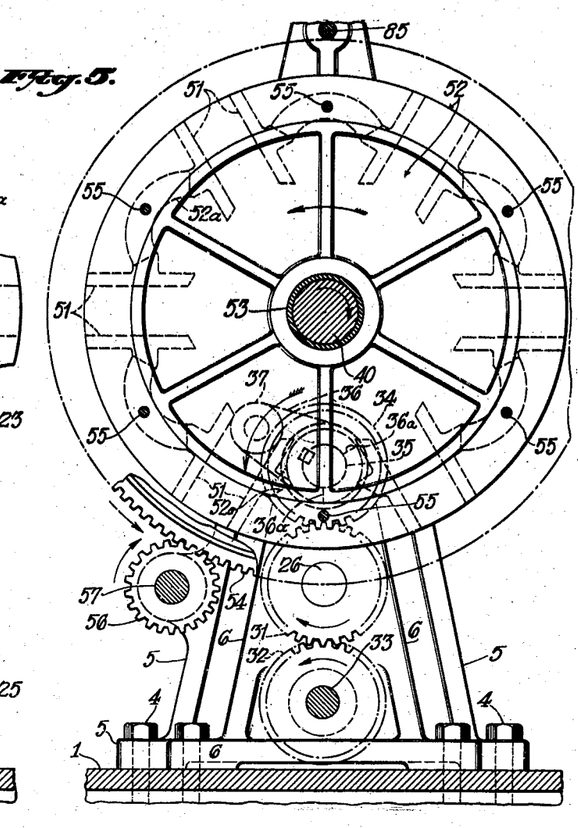
Figure 6:
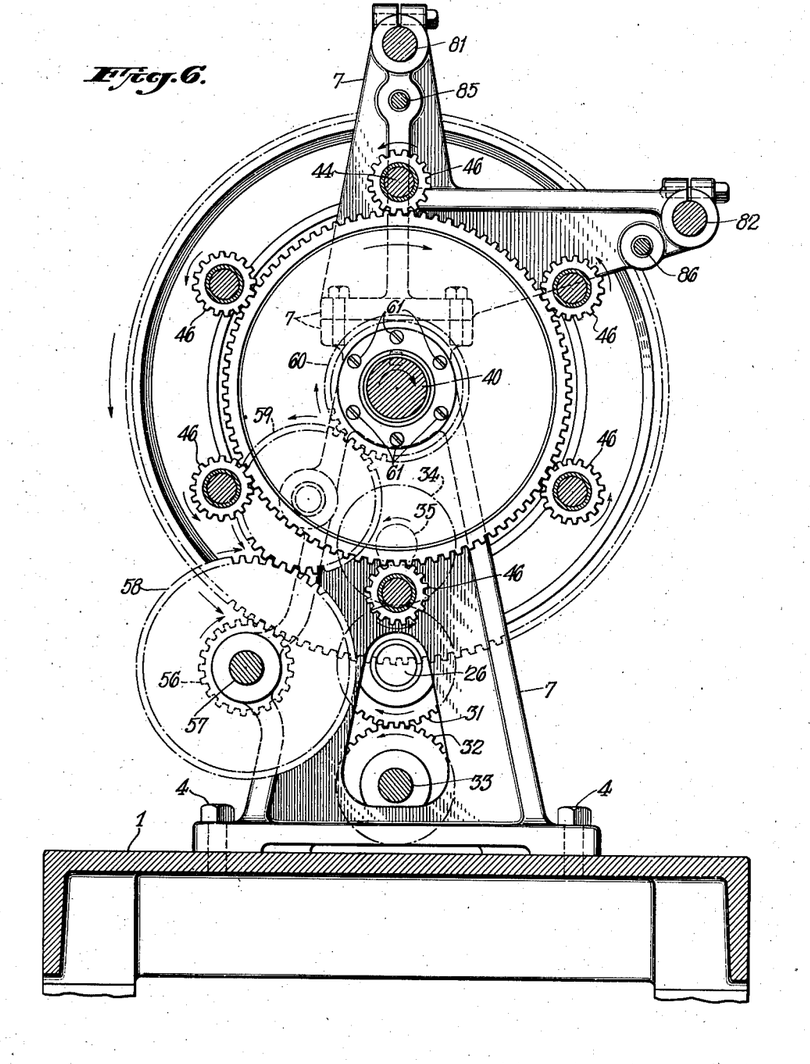

The gear wheel 31 also meshes with a gear wheel 34 secured to and rotatable with a shaft 35 journalled in the uprights 5 and 6, Fig. 2, the shaft 35, at its end toward the right, Fig. 2, carrying a crank arm 36 having a roller 37 secured to the end thereof, the crank arm hub comprising an arcuate member 36a disposed opposite said crank arm 36, Fig. 5.

The hereinbefore described roller 29 on the crank arm 28 is adapted to coact successively with slots 38 formed radially in a disk 39 secured to and rotatable with a horizontal shaft 40 journalled in the aforesaid uprights 5 and 7, Fig. 2, the arm 28 together with the roller 29 in conjunction with the slots 38 of the disk 39 constituting a Geneva movement as well known in the art.

The shaft 40, at its end toward the right, Figs. 1 and 2, has a disk 41 secured thereto for rotatable movement therewith, said disk 41 having thereon a plurality of duplicate spindle arrangements adapted, respectively, to carry tubular articles A which are subjected to threading, cutting and other operations in the manner hereinafter described.

As regards the form of my invention herein disclosed, the tubular articles A are of duplicate character. Each article A is a cylindrical tube which is so shaped that it is open at one end and closed at its other end by a semi-spherical integral section of the cylindrical tube. These are standard articles of commerce and, ordinarily, they are formed from suitable cellulosic material. By the present invention, each article is threaded between the ends thereof and, then, at the end of the threaded section toward the open tube end, each article is cut into two pieces. By so doing, tubular articles are obtained which are closed at one end and threaded at the other end. These are adapted to serve as containers utilizable for any desired purposes.

Figures 11, 12, 13, 14, 15:
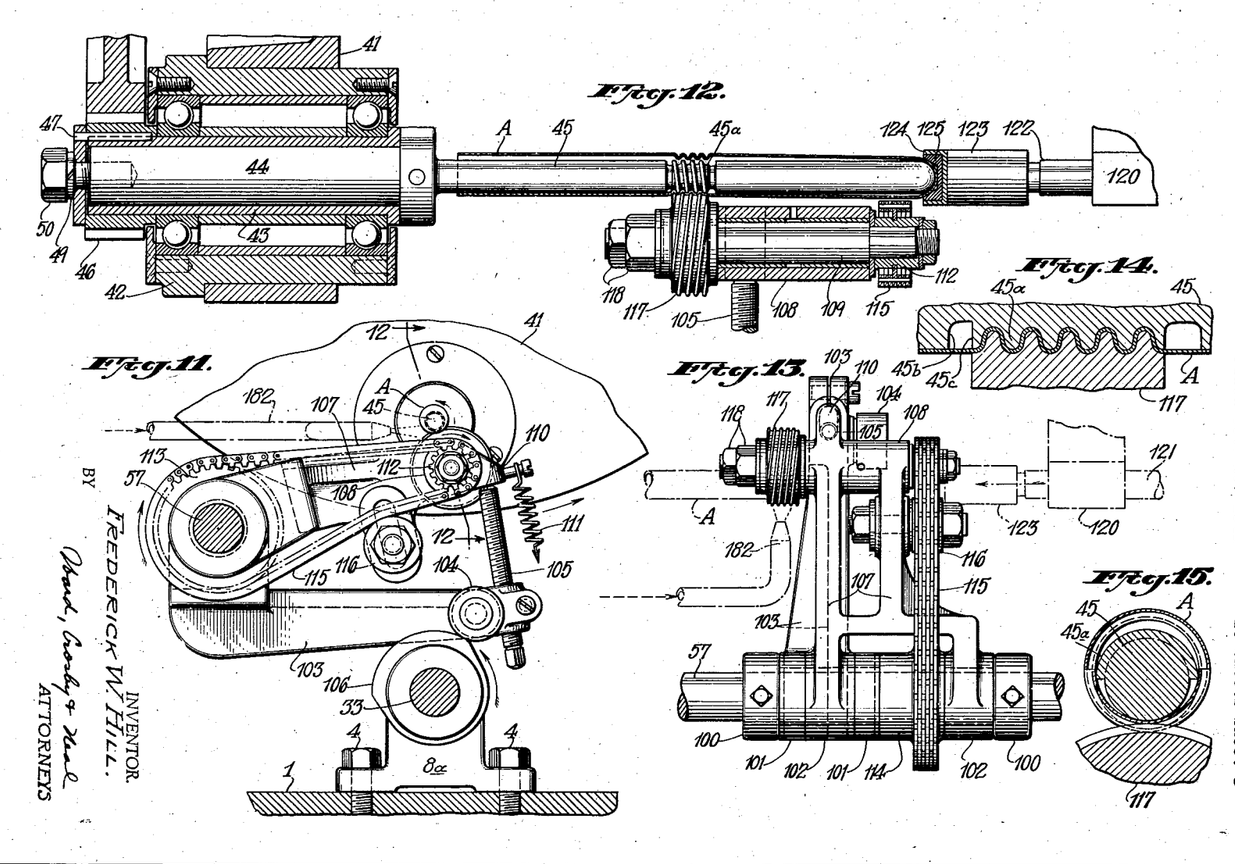
Fig. 11 is an enlarged, transverse vertical sectional view, partly in elevation, taken on the line 11—11 of Fig. 3 looking in the direction of the arrows.
Fig. 12 is an enlarged sectional view, partly in elevation, taken on the line 12—12 of Fig. 11, looking in the direction of the arrows.
Fig. 13 is a plan view showing the mechanism illustrated in Fig. 11.
Fig. 14 is a fragmentary, enlarged sectional view, illustrating the threading operation of my invention.
Fig. 15 is a vertical sectional view further illustrating the threading operation of my invention.

Referring particularly to Fig. 12, each of the aforesaid spindle arrangements is shown as comprising a bearing support formed by a sleeve 42 extending through a passage formed in the disk 41, said sleeve 42 being fixed to said disk 41. Cooperative with the fixed sleeve 42 is an inner rotatable sleeve 43 and, between the two sleeves, there is disposed a suitable anti-friction bearing arrangement of a character well known in the art. Disposed snugly within the sleeve 43 is a member 44 forming the shank of an article-supporting spindle 45. As illustrated, the spindle shank 43 projects beyond that side of the disk 31 toward the left, Fig. 12, and there carries a gear wheel 46. The spindle shank 44 and the gear wheel 46 are secured together for rotatable movement as a unit by the key 47, washer 48, locking washer 49 and bolt 50.

The hereinbefore described roller 37 on the crank arm 36 is adapted to coact successively with slots 51 formed radially in a disk 52 freely rotatable on a sleeve 53 mounted, in turn, in freely rotatable relation on the aforesaid shaft 40, Fig. 2, the roller 37 in conjunction with the slots 51 of the disk 52 constituting a Geneva movement. The plane face of the disk 52 toward the right, Fig. 2, has a gear wheel 54 secured thereto by bolts 55, the gear wheel 54 meshing with a gear wheel 56 secured to and rotatable with a shaft 57 journalled in bearings formed in the aforesaid standards 7 and 12. The shaft 57 carries a gear wheel 58 which meshes with a gear wheel 59 carried by a stub shaft projecting from the standard 7, Fig. 2. The gear wheel 59 meshes with a gear wheel 60 freely rotatable on the aforesaid sleeve 53, the hub of the gear wheel 60 being secured by bolts 61, to the hub of a gear wheel 62 likewise freely rotatable on the sleeve 53, the gear wheel 62 being utilizable as hereinafter described.

Under the control of the motor 20, the hereinbefore described shaft 26 is rotated at suitable constant speed. Once for each cycle of rotative movement of the shaft 26, the roller 29 of the crank arm 28 enters one of the slots 38 of the disk 39 and imparts a step of rotative movement to said disk 39 in a counter-clockwise direction, Fig. 4. As shown, the disk 39 comprises six of the slots 38 and these are spaced equi-distantly and concentrically around the center of the shaft 40. Hence, the slots 38 are sixty degrees apart and, therefore, each step of rotative movement of the disk 39 produces movement of the shaft 40 through a corresponding angle of sixty degrees, the shaft 40 carrying therewith the disk 41 which rotates in the same direction as the disk 39.

During each period, while the roller 29 is disengaged from the disk 39, the crank arm arcuate member 28a moves in an arcuate recess 39a formed in the disk 39 between a pair of the slots 38 whereby rotative movement of the disk 39 is prevented during such period. As will be noted, one of the recesses 39a is formed between each pair of the slots 38.

As shown, the disk 41 carries six of the described spindle arrangements, these being spaced equi-distantly and concentrically around the center of the shaft 40. As stated, the disk 41 is carried by the shaft 40 and, therefore, said disk 41 rotates through an angle of sixty degrees each time that the crank arm 28 rotates through one complete cycle. Thus, the spindles 45 are stepped from position to position along a path concentrically related to the shaft 40.

Further in response to each cycle of rotative movement of the shaft 26, the roller 37 of the crank arm 36 enters one of the slots 51 of the disk 52 to impart a step of rotative movement to said disk 52 in a counter-clockwise direction, Fig. 5, i. e., in a direction the same as that imparted to the disk 39 by the roller 29. The disk 52 comprises six of the slots 51 which are spaced equidistantly and concentrically around the center of the shaft 40. Therefore, each step of rotative movement of the disk 52 produces movement of the gear wheel 54 through an angle of sixty degrees. The gear wheel 62 is connected to the gear wheel 54 through the described mechanical connection comprising the gear wheel 56, shaft 57 and gear wheels 58, 59 and 60. Therefore, each step of rotative movement of said gear wheel 54 effects rotative movement of the gear wheel 62 through a predetermined angle.

During each period, while the roller 37 is disengaged from the disk 52, the crank arm arcuate member 36a moves in an arcuate recess 52a formed in the disk 52 between a pair of the slots 51 whereby rotative movement of the disk 52 is prevented during such period. As will be noted, one of the recesses 52a is formed between each pair of the slots 51.

As stated above, the spindle arrangements are spaced concentrically around the center of the shaft 40 and the arrangement is such that the described gear wheel 62 meshes with all of the gear wheels 46 of said spindle arrangements. Therefore, as will be understood, each time that a step of rotative movement is imparted to the gear wheel 62, all of the gear wheels 46 are rotated to thereby rotate the respective spindles 45.

The timing is such that the crank arm 36 is moving through the idle part of its stroke out of contact with the disk 52 each time that the crank arm 28 is acting to impart a step of rotative movement to the disk 39. Vice versa, the crank arm 28 is moving through the idle part of its stroke out of contact with the disk 39 each time that the crank arm 36 is acting to impart a step of rotative movement to the disk 52. Further, the relation of the crank arms 28 and 36 to the respective disks 39 and 52 is such that each step of rotative movement of the disk 39 occurs while the crank arm 28 is moving through an angle of 120 degrees, and each step of rotative movement of the disk 52 occurs while the crank arm 36 is moving through an angle of 240 degrees. It follows, therefore, that movement of the disk 52 is initiated as the disk 39 becomes stationary and, as soon as the disk 52 becomes stationary, movement of the disk 39 is resumed.

As stated, the directions of rotation of the respective disks 39 and 52 are the same. Further, the gear ratio between the disk 52 together with the gear wheel 54 and each gear wheel 46 as obtained by the gear wheels 54, 56, 58, 59, 60 and 62 is such that, in the form of the invention herein shown, although not necessarily, each spindle 45 rotates nine times through an angle of 360 degrees for each step of movement of the disk 54. Thus, each time that the crank arm roller 29 is in engagement with one of the disk slots 38, the disk 41 and all of the spindle arrangements carried thereby are stepped through an angle of 60 degrees. While this occurs, all of the spindles 45 are slowly rotated on their respective longitudinal axes by reasons of the meshing engagement of the moving gear wheels 46 with the gear wheel 62 which at this time is stationary. Each time that the crank arm roller 37 is in engagement with one of the slots 51, all of the spindles 45 are rotated nine times through an angle of 360 degrees. While this occurs, the disk 41 is stationary.

The hereinbefore described standards 10 and 11 serve as a support for a magazine arrangement adapted to contain a plurality of the tubular articles A which may be disposed therein manually by an operator. Thus, by reference particularly to Figs. 1, 7, 8 and 9, the standards 10 and 11 are shown as having upper and lower cross bars 65 and 66 suitably secured thereto by screws or equivalent, the upper cross bar 65, preferably, being braced by rods 67 secured thereto and to the respective standards 10 and 11.

The cross bars 65 and 66 together with the upper inclined surfaces of the respective standards 10 and 11 have a box or receptacle 68 secured thereto by screws or the like, this receptacle 68 comprising an inclined bottom wall 68a, a fixed side wall 68b and a side wall 68c which, preferably, is adjustable toward and from the side wall 68b. To this end, upstanding blocks 69 may be secured to the respective cross bars 65 and 66, Fig. 1, each of these blocks being provided with a horizontal, threaded passage for the reception of an adjusting screw 70. These adjusting screws 70 are swivelled to the adjustable side wall 68c and form a support therefor. Obviously, the screws 70 may be rotated in unison in one direction or the other to move the side wall 68c either toward or from the fixed side wall 68b whereby tubular articles A of a desired length may be received in the receptacle 68. As shown in Fig. 1, each screw 70 may be equipped with a locking nut to thereby hold the same in a desired adjusted position.

Figures 8, 9, 10:
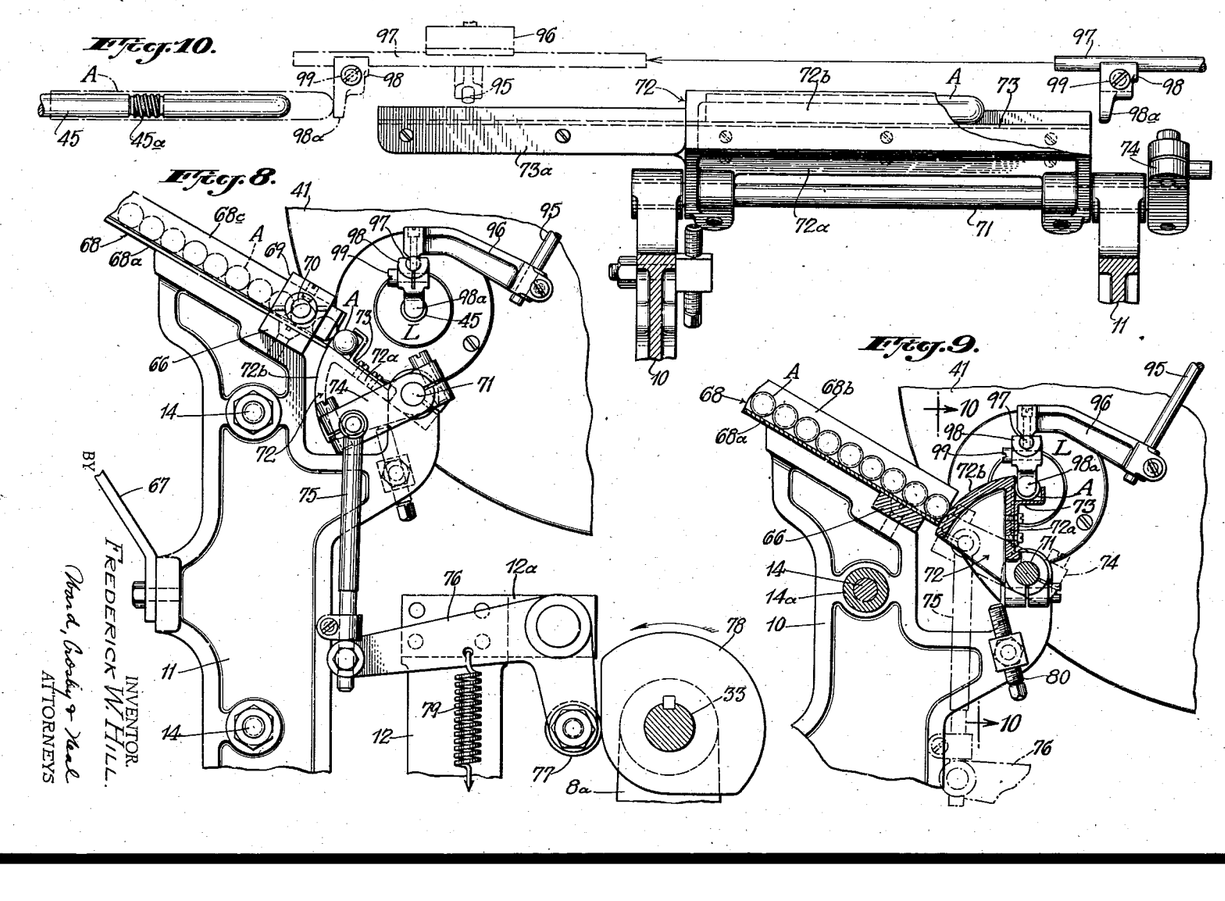
Fig. 8 is an enlarged, end elevational view, partly in section, showing a part of the mechanism illustrated in Fig. 7.
Fig. 9 is a transverse, vertical sectional view, partly in elevation, taken on the line 9—9 of Fig. 3, looking in the direction of the arrows and showing some of the parts positioned differently than in Fig. 8.
Fig. 10 is a vertical sectional view, partly in elevation, taken on the line 10—10 of Fig. 9, looking in the direction of the arrows.

As illustrated in Figs. 8 and 9, rearwardly disposed upper extensions of the standards 10 and 11 form a bearing supporting arrangement for a horizontal shaft 71 to which is secured a dispenser gate 72 comprising end walls connected together by a plane section 72a and an arcuate section 72b, these end walls and section being formed, preferably, from a single casting. Secured to the outer upper surface of the plane section 72a is a member 73 terminating in an angular section forming with the adjacent surface of the plane section 72a a trough or channel adapted to successively receive individual tubular articles A as hereinafter described.

The arrangement is such that the arcuate section 72b of the dispenser gate 72 is movable along a path disposed closely adjacent the lower open end of the receptacle 68. In all positions of the dispenser gate 72 except the lowermost position, Fig. 8, said arcuate section 72b closes said lower open end of the receptacle 68 and prevents movement of the tubular articles A therefrom. However, in the position of Fig. 8, the arcuate section 72b is entirely below the receptacle 68 and, hence, the lowermost tubular article A moves, under the influence of gravity, into the trough formed in part by the member 73.

As shown in Fig. 8, one end of the shaft 71 has secured thereto one end of a lever 74 to which is pivoted the upper end of a depending link 75 pivoted, at its lower end, to one arm of a bell crank lever 76 pivoted to an extension 12a of the standard 12. The other arm of the bell crank lever 76 carries a roller 77 coactable with a cam 78 secured to and rotatable with the aforesaid cam shaft 33. As shown in Fig. 8, the lever 76 is suitably biased in counter-clockwise direction by a spring 79 which tends to maintain the dispenser gate 72 in the lowermost position shown in said Fig. 8, this position being determined by a stop member 80 adjustably carried by the standard 10, Fig. 9.

With the parts positioned as shown in Fig. 8, one of the tubular articles A has been received within the trough formed in part by the member 73. As the cam shaft 33 rotates in a counter-clockwise direction, Fig. 8, the cam 78 functions to swing the bell crank lever 76 against the action of the spring 79 to thereby elevate the link 75, the lever 74 and the dispenser gate 72; the arcuate section 72b of the latter, as it moves upwardly, obstructing the discharge end of the receptacle 68. Upward movement of the tubular article A carried by the aforesaid trough continues until the high section of the cam 78 comes into engagement with the roller 77.

As shown in Fig. 8, this cam high section is of extended length and, therefore, the tubular article A remains stationary in its upper position for a substantial period of time with its longitudinal axis horizontally disposed.

Figure 7:
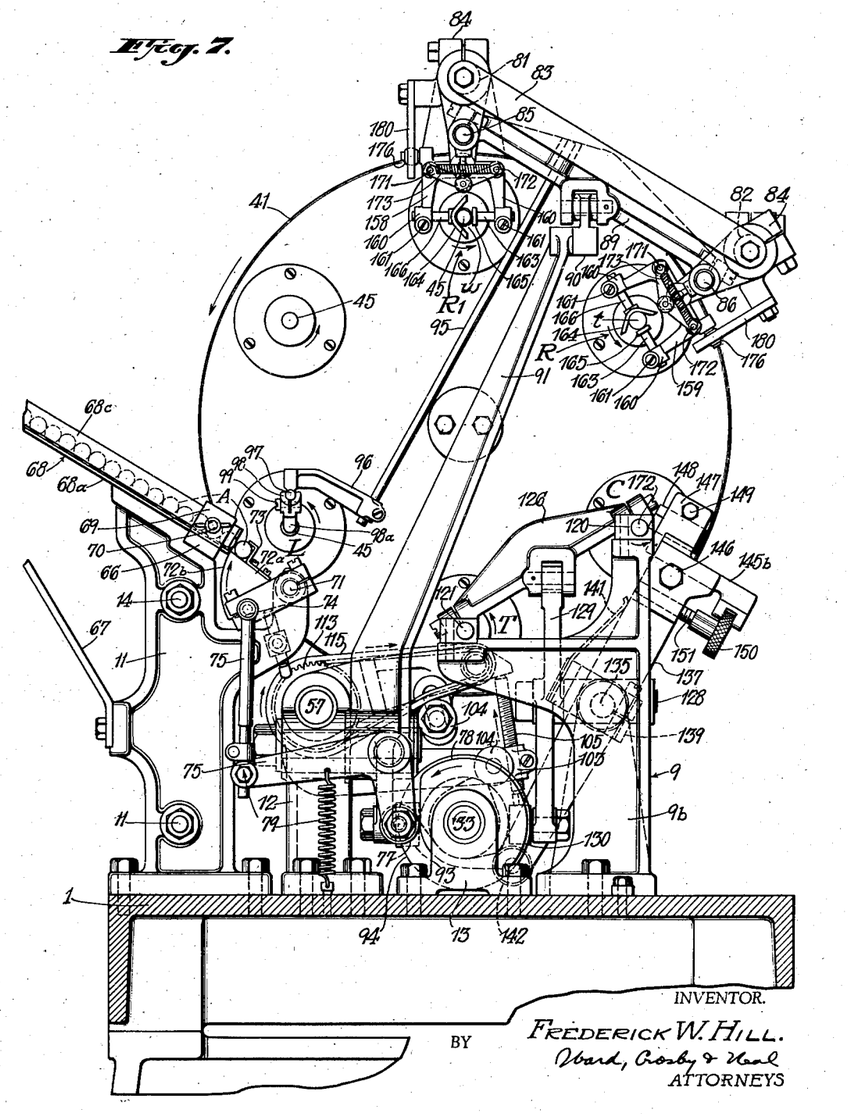
Fig. 7 is an end elevational view, partly in section, showing the machine illustrated in Fig. 1.

Each of the spindles 45, as it is stepped along a path concentrically related to the shaft 40 as hereinbefore described, remains stationary for an interval in a loading position L, Fig. 7, wherein the horizontal axis thereof is alined with the horizontal axis of any tubular article A which is disposed within the aforesaid trough when the latter is in its uppermost position as described above. The timing is such that any empty spindle 45 thus remains stationary in the loading position L and any tubular article A thus remains in its uppermost position coincidentally. During this period, by mechanism hereinafter to be described, the tubular article A is moved longitudinally along an extension trough formed by an extension of the member 73 and a plate 73a secured thereto, Fig. 10, onto the waiting spindle 45. Thereafter, the low section of the cam 78 moves into engagement with the cam roller 77, whereupon the gate dispenser 22 moves to its lowermost position as shown in Fig. 8 and automatically receives the now lowermost tubular articles A into the trough formed at the top thereof, the tubular article A last named, in turn, being elevated to the upper position as shown in Fig. 9. While this is happening, the disk 41 has had a step of movement imparted thereto whereby the loaded spindle 45 has been moved sixty degrees in a counter-clockwise direction, Fig. 7, from the position L and the following empty spindle 45 has been moved into said position L.

Figure 3:
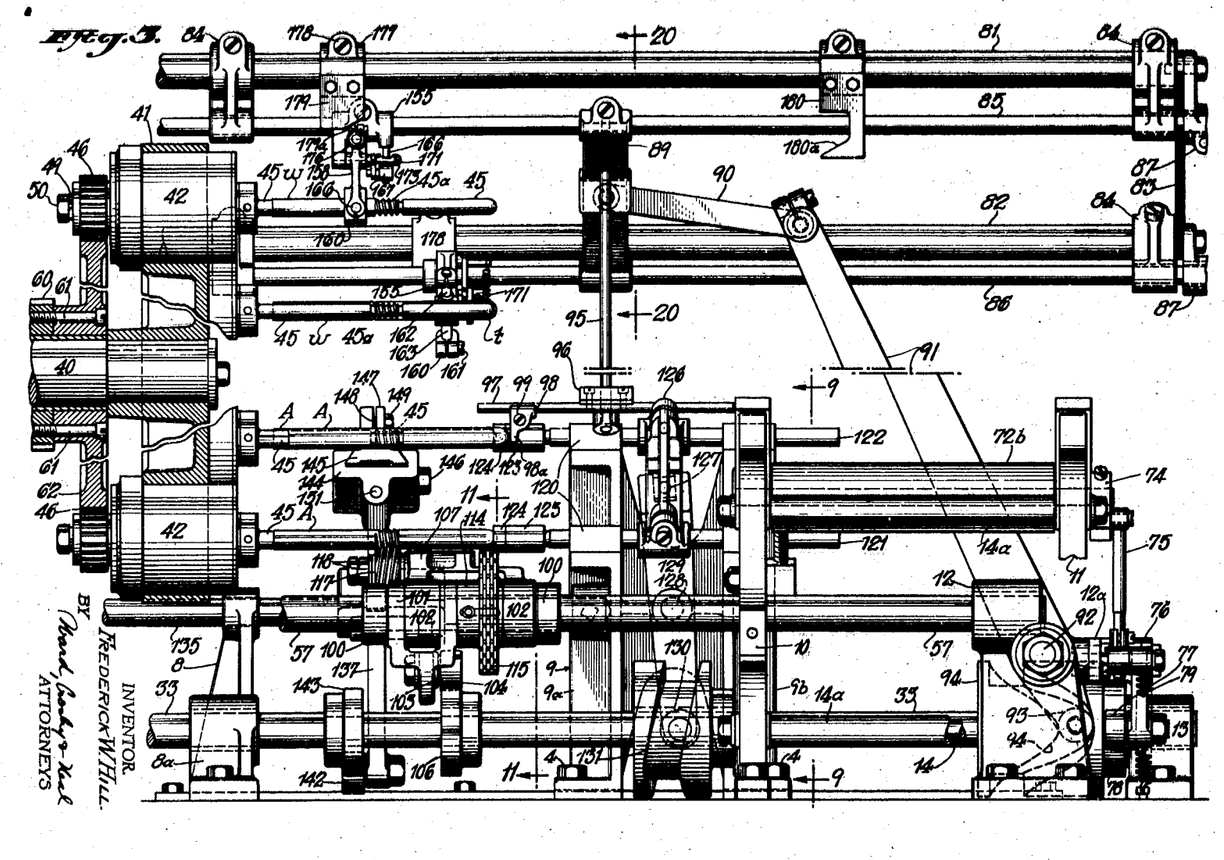
Figure 4:
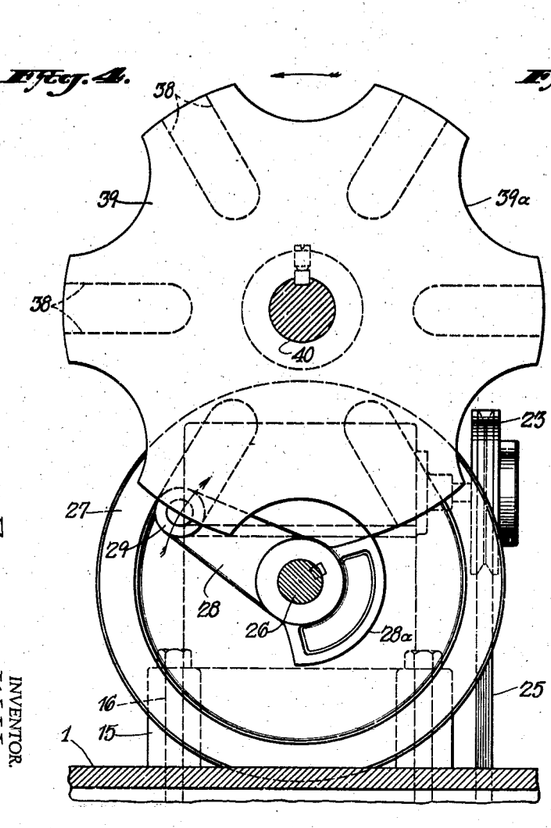
Figs. 4, 5 and 6 are transverse, vertical sectional views, partly in elevation, taken on the respective lines 4—4, 5—5 and 6—6 of Fig. 1 looking in the direction of the arrows.

Referring to Figs. 1, 3 and 7, the standards 5 and 7 are shown as supporting a pair of horizontally disposed fixed members 81 and 82 which extend from left to right and, at their free ends, are braced by a member 83. Each of the members 81 and 82 carries a plurality of depending brackets 84 of the member 81 supporting a rod 85 in slidable fashion and the brackets 84 of the member 82 supporting a rod 86, in similar slidable fashion. If desired, the members 81 and 82 may carry the respective depending brackets 87 which support the protective tubular members 88, respectively, in which the free ends of the slidable rods 85 and 86 are slidably received.

Approximately midway between the ends thereof, the rods 85 and 86 have fixed thereto a crosshead or transverse member 89 to which is pivoted one end of a link 90 pivoted, at its other end, to the upper end of a lever 91 which, adjacent its lower end, Figs. 1 and 3, is pivoted at 92 to the aforesaid standard 12. The lower end of the lever 91 carries a cam roller 93, which coacts with a cam 94 mounted on the aforesaid cam shaft 33.

Once during each cycle of operation which occurs while the disk 41 remains stationary, i. e., during rotation of the cam shaft 33 through an angle of 360 degrees, the cam 94 swings the lever 91 in opposite directions, Fig. 1, to thereby move the rods 85 and 86 to and beyond the position thereof shown in Fig. 1 and then return them to normal position.

The aforesaid crosshead has secured thereto a depending rod 95 carrying, at its lower end, a transverse member 96, to which is secured a pusher rod 97, Fig. 10, extending in the same longitudinal direction as does any tubular article A when the latter is positioned in its trough as shown in Fig. 9. The pusher rod 97 has a split-hub bracket 98 adjustably secured thereto by a screw 99, the bracket 98 terminating in a depending pusher finger 98a.

The timing is such that, after a tubular article A has been positioned in its trough as shown in Fig. 9 and while an empty spindle 45 is stationary in the loading position L as described above, the cam 94 becomes effective to move the rods 85 and 86 to the position shown in Fig. 1. In so doing, the pusher finger 98a is moved from the full line position to the broken line position thereof shown in Fig. 10 whereby the rear surface of said tubular article A is engaged to thereby move the same from the supporting trough therefor and onto the waiting empty spindle 45. After completion of this operation, the lever 91 swings clockwise, Fig. 1, to return the rods 85 and 86 together with the pusher finger 98a to the normal respective positions thereof at the extreme right of said Fig. 1.

Accordingly, in the manner described, individual tubular articles A are moved onto each empty spindle 45 immediately after the latter becomes stationary in the loading position L. After each spindle 45 is loaded, it moves counter-clockwise one step, Fig. 7, to the position T where it pauses while the tubular article A supported thereby is subjected to a threading operation in a manner hereinafter described.

Referring particularly to Fig. 13, the hereinbefore described shaft 57 is shown as having a pair of spaced collars 100, 100 secured thereto by screws, or equivalent. Freely oscillatory on the shaft 57 between the collars 100 are the inter-leaved hub sections 101, 101 and 102, 102.

The hub sections 101, 101 merge into a lever 103 carrying a cam roller 104 and a set screw 105 adjacent its free end, the cam roller 104 being coactable with a cam 106 secured to and rotatable with the cam shaft 33 and the set screw 105 being utilizable as hereinafter described.

The hub sections 102, 102 merge into a frame 107 which, adjacent its free end, forms a bearing 108 for a shaft 109, the extreme end of the frame 107 forming a nose 110 with which the end of the aforesaid set screw 105 engages, said nose 110 having a suitably anchored spring 111 secured thereto whereby the frame 107 is biased in a clockwise direction, Fig. 11.

One end of the shaft 109 has secured thereto a sprocket wheel 112 which is alined with a sprocket wheel 113 having its hub 114 secured to the shaft 57 for rotatable movement therewith.

Coactable with the sprocket wheels 112 and 113 is an endless sprocket chain 115 which may be maintained taut by a roller 116 adjustably mounted on an extension of the frame 107.

Secured to the end of the shaft 109 opposite the sprocket wheel 112 is a circular threading die 117 which is maintained in operative position on said shaft 109 by the nut members 118.

The lever 103 and the frame 107 are both freely oscillatory on the shaft 57, the arrangement being such that the cam 106 supports the lever 103, the latter, through the set screw 105, supporting the frame 107. The shaft 109 and the thereby-carried threading die 117 are disposed parallel with and closely adjacent any spindle 45 which is in the threading position T. By the high section of the cam 106, the die 117 is moved into threading position and, when the high cam section recedes from the lever 103, the spring 111 moves said threading die 117 downwardly from its threading position.

Each of the spindles 45 comprises a threading die 45a with which the threading die 117 is adapted to cooperate as shown in Fig. 12. However, before these dies are brought into coacting relation, it is necessary to move a member into supporting relation with respect to the end of the spindle 45. This feature of the invention will now be described.

Figures 17, 18, 19:
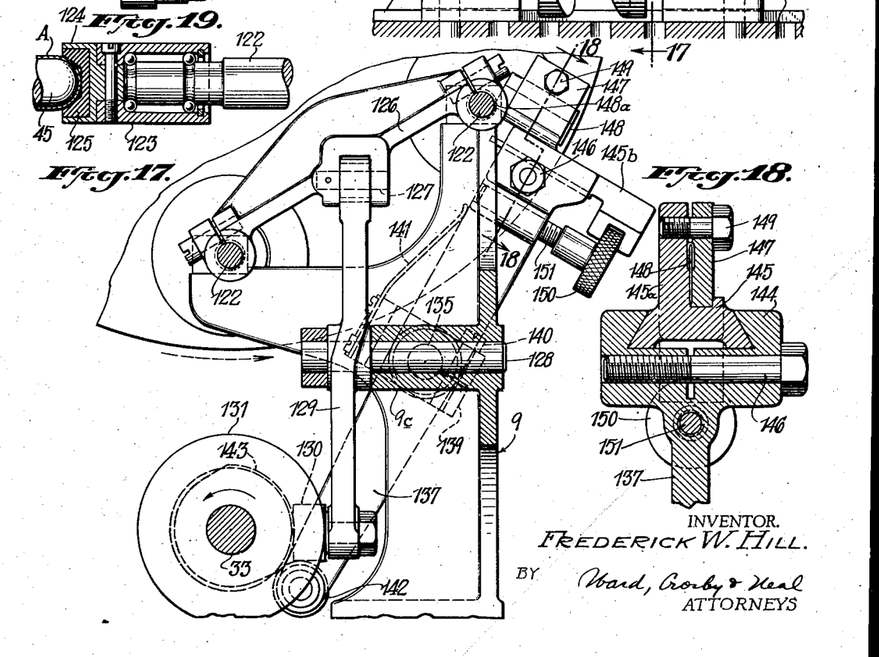
Fig. 17 is a vertical sectional view, partly in elevation, taken on the line 17—17 of Fig. 16 looking in the direction of the arrows.
Fig. 18 is a sectional view, partly in elevation, taken on the line 18—18 of Fig. 17 looking in the direction of the arrows.
Fig. 19 is an enlarged horizontal sectional view, partly in plan, taken on the line 19—19 of Fig. 16 looking in the direction of the arrows.

Referring to Figs. 7, 16 and 17, the hereinbefore described sections 9a and 9b of the standard 9 are shown as being of similar shape. Each of these standard sections has secured thereto a pair of blocks 120, 120 which are disposed, respectively, at different levels. The lower blocks 120 on the standard sections 9a and 9b are disposed at the same horizontal level and the same is true of the upper blocks 120 on said standard sections 9a and 9b. Each of the blocks 120 is provided with a horizontal passage extending longitudinally of the machine, the passages of the lower blocks 120 freely receiving a rod 121 and the passages of the upper blocks 120 freely receiving a rod 122.

As shown in Fig. 19, the rod 122, at the end thereof toward the left, has a sleeve 123 disposed thereon in freely rotatable relation, suitable antifriction members being disposed between the rod and sleeve to decrease the friction. Carried by the sleeve 123 is a cup-shaped member 124 having disposed therein a rubber plug 125 provided with a depression utilizable as hereinafter described. Although not shown in detail, it will be understood that the other rod 121 has associated with the end thereof toward the right a sleeve and cup arrangement similar to that described above.

The rod 121 and its cup-shaped member 124 are disposed in longitudinal alinement with each spindle 45 as it remains stationary in the threading position T. The rod 122 and its cup-shaped member 124 are disposed in longitudinal alinement with each spindle 45 as it remains stationary in the article-cutting position C, this being the position in which each spindle 45 remains stationary for an interval after it has moved counter-clockwise one step, Fig. 7, from the position T.

Between the standard sections 9a and 9b, the rods 121 and 122 have fixed thereto a crosshead or transverse member 126 which, midway between the ends thereof, is provided with a downwardly facing recess across which a horizontally disposed pin 127 extends. The standard 9 comprises a horizontally disposed bearing section 9c adapted to support an axle 128 serving as the support for an oscillatory cam lever 129 which has its upper end extending into the aforesaid recess of the crosshead 126, said upper end of the lever 129 being provided with a recess in which the pin 127 is loosely received. The lower end of the lever 129 carries a cam roller 130 cooperative with a cam 131 secured to and rotatable with the aforesaid cam shaft 33.

During those intervals while the disk 41 remains stationary, it will be understood that stationary spindles 45 occupy the respective threading and cutting positions T and C, each of the spindles 45 last named carrying an article A which was previously disposed thereon in the loading position L.

Just after the disk 41 and its spindles 45 complete a step of movement in a counter-clockwise direction, Fig. 7, the cam 131 becomes effective to move the rods 121 and 122 to the respective positions thereof shown in Fig. 16 whereby the freely rotatable cup-shaped members 124 engage and support the respective spindles 45 last named together with the respective tubular articles A carried thereby. While thus engaged and supported, the tubular articles A last noted are subjected, respectively, to threading and cutting operations and, after these have been completed, the cam 131 becomes effective to move the rods 121 and 122 from left to right, Fig. 16, to thereby remove the supporting cup-shaped members 124 from the ends of the respective spindles 45 with which they had previously been associated.

More specifically, when a spindle 45 and a thereby-supported tubular article A assumes a stationary position in the threading position T, the cup-shaped member 124 of the rod 121 moves immediately into supporting relation as described above. In so doing, the article A is registered on its supporting spindle 45 in the sense that it is moved axially on the spindle until the semispherical closed end of said article comes into engagement with the corresponding shaped end of said spindle, Fig. 12. Thereupon, the high section of the cam 106, Fig. 11, moves into engagement with the lever 103 to move the same together with the frame 107 in a counter-clockwise direction, Fig. 11, whereby the threading die 117 in conjunction with the threading die 45a of the associated spindle 45 are brought into coacting relation.

For each step of movement of the disk 54, the shaft 57, Figs. 2 and 11, rotates through an angle of 360 degrees. The diametrical relation between the sprocket wheel 113 carried by the shaft 57 and the sprocket wheel 112 carried by the shaft 109 is as 3:1 and, hence, for each step of movement of the disk 54, the threading die 117 rotates three times through an angle of 360 degrees, the direction of rotation being opposite that of the spindle threading die 45a. The diameter of the threading die 117 is related to the diameter of the spindle threading die 45a as 3:1 and, as hereinbefore stated, each spindle 45 rotates nine times through an angle of 360 degrees for each step of movement of the disk 54. Therefore, the dies 117 and 45a rotate at the same surface speed to thread the tubular member A, this operation proceeding as long as the high section of the cam 106 remains in engagement with the roller 104, Fig. 11.

From a consideration of Fig. 12, it clearly appears that the internal diameter of the tubular article A is somewhat greater than the external diameter of the spindle 45. By reason of this loose fit, the threading operation is effected more satisfactorily than would be the case if the tubular article A snugly engaged the spindle 45.

As the high section of the cam 106 recedes from the roller 104, the threading die 117 descends from its threading position. Thereupon, the cam 131 removes the cup-shaped member 124 from the end of that spindle 45 in the threading position. Next, movement of the disk 54 is discontinued and the rotation of all of the spindles ceases. At this time, the disk 41 has a step of rotative movement imparted thereto to move that spindle 45, which was in the threading position T as described above, into the cutting position C where the threaded article A is cut into two pieces as hereinafter described.

Referring to Fig. 1, one end of a horizontal supporting member 135 is shown as supported in freely slidable relation in a passage formed in the hereinbefore described standard 8, the other end of the supporting member 135 being detachably received in a passage formed in the section 9a of the standard 9. As shown in Fig. 16, said last named end of the supporting member 135 may be provided with a passage which receives a pin 136 for detachably and non-rotatably retaining said supporting member 135 in the position shown.

A cam lever 137, midway between its ends, comprises a hub section 138 having a horizontal passage extending therethrough for the reception, in loose-fitting relation, of the supporting member 135. A U-shaped bracket 139 forms a pocket in which the hub section 138 is movable, one side of the bracket 139 being of split-sleeve construction, Fig. 17, for the reception of a screw 140 which serves to clamp said bracket 139 to the supporting member 135. One end of a leaf spring 141 is suitably anchored to the bracket 139, the other end of said leaf spring 141 coacting with the cam lever 137 to bias the same in a clockwise direction, Fig. 17.

The lower end of the cam lever 137 has a cam roller 142 secured thereto, this cam roller 142 coacting with a cam 143 secured to and rotatable with the aforesaid cam shaft 33.

The upper end of the cam lever 137 is provided with a head 144 which, in dove-tail relation, receives a supporting member 145, the head 144 being of slotted construction and having a screw 146 extending therethrough for clamping the supporting member 145 in a desired position. The supporting member 145 comprises an upper plate extension 145a having a plate member 147 disposed adjacent thereto. Disposed between the plate section 145a and the plate member 147 is a cutting tool 148 which, by preference, is a safety-razor blade of known type wherein a stiff blade has a U-shaped housing at one side thereof. The cutting tool 148 is maintained in proper assembled relation between the plate section 145a and the plate member 147 by a screw 149 which, when tightened, clamps the plate member 147 in the position shown in Fig. 18.

The aforesaid supporting member 145 has an extension 145b extending to one side of the head 144, this extension being provided with a downwardly facing slot adapted to receive the head 150 of an adjusting screw 151 threaded through the cam lever 137 immediately below the head 144 thereof. With the clamping screw 146 retracted to some extent, it will be understood that the head 150 of the screw 151 may be rotated in one direction or another to thereby move the supporting member 145 and change the position of the cutting point 148a of the tool 148.

As stated above, that spindle 45 in the threading position T moves, responsive to a step of movement imparted to the disk 41, into the cutting position C whereupon immediate rotation of all the spindles 45 occurs responsive to a step of movement imparted to the disk 52. As soon as said spindle is thus positioned, the cam 131 becomes effective to move the rods 121 and 122 to the respective positions thereof shown in Fig. 16 whereby the cup-shaped member 124 of the rod 122 engages and supports the last named spindle 45. In so doing, the threaded tubular article A thereon is registered by moving the same axially to the extent permitted. At the same time, the cup-shaped member 124 of the rod 121 engages and supports the tubular article on that spindle 45 which is now located in the threading position T.

After the threaded tubular article A has been registered in the cutting position C as described above, it is positioned closely adjacent the cutting point 148a of the tool 148. From a consideration of Fig. 14, it will be noted that the illustrated spindle 45 is provided with a peripheral slot 45b having a plane wall surface 45c adjacent the spindle die section 45a. The cutting point 148a should move along this plane wall surface 45c during the cutting operation.

In proper timed relation, the cam lever 137 is swung counter-clockwise, Fig. 17, by the cam 143 whereby the cutting point 148a of the tool 148 moves as described above to cut the rotating tubular article A into two pieces, i. e., a threaded section t and a waste section w. After completion of the cutting operation, the cam lever 137 swings clockwise, Fig. 17, under the control of the spring 141 to move the cutting tool to its non-operative position. Thereafter, the associated cup-shaped member 124 is retracted and rotation of all of the spindles 45 ceases. Responsive to the succeeding step of movement of the disk 41, the spindle 45 carrying the threaded section t and the waste section w moves into a position R wherein the threaded section t is removed from the spindle 45. Responsive to the next step of movement, the spindle 45 carrying the waste section w moves into a position R1 wherein said waste section w is removed from the spindle 45. Mechanism for performing these operations will now be described.

Referring to Figs. 20-25, the hereinbefore described rod 85 is shown as having a split-sleeve bracket 155 secured thereto by a clamping screw 156. This bracket 155 comprises a depending section 155a which supports a horizontal pin 157 having a pair of members 158, 159 pivoted thereon. Each of these members has a downwardly extending section terminating in a split sleeve 160 having a clamping screw 161 cooperative therewith. These split sleeves carry the respective shanks 162 and 163 which extend toward each other, the shank 162 carrying a channel member 164 and the shank 163 terminating in a circular head 165 formed preferably of rubber.

Figures 20, 23, 24, 25:
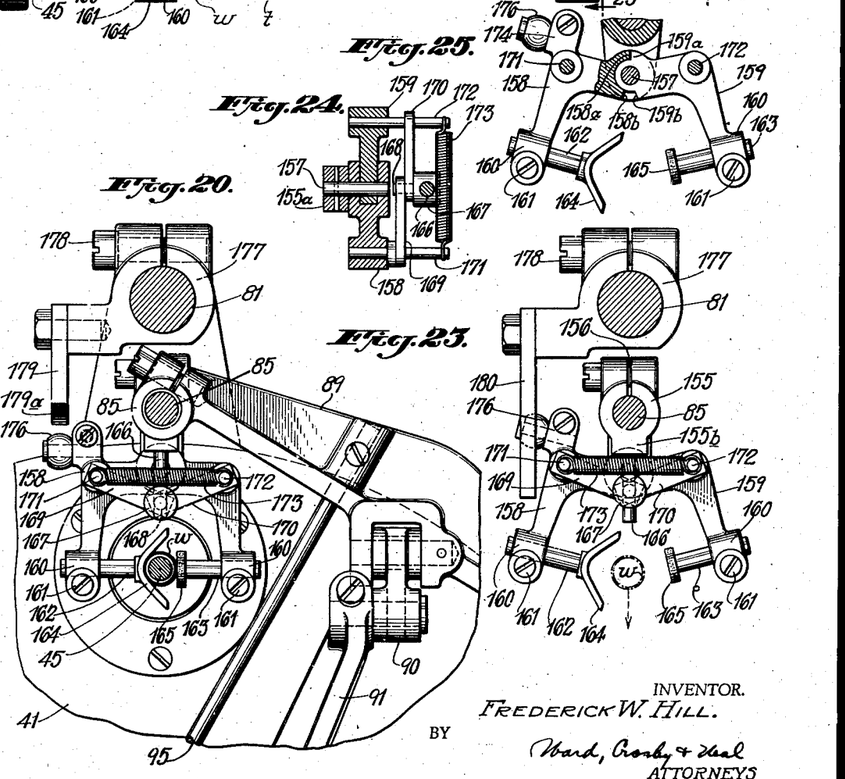
Fig. 20 is an enlarged, vertical sectional view, partly in elevation, taken on the line 20—20 of Fig. 3 looking in the direction of the arrows.
Fig. 23 is a transverse, vertical sectional view, partly in elevation, taken on the line 23—23 of Fig. 22 looking in the direction of the arrows.
Fig. 24 is a horizontal sectional view, partly in plan, taken on the line 24—24 of Fig. 21 looking in the direction of the arrows.
Fig. 25 is a vertical sectional view, partly in elevation, taken on the line 25—25 of Fig. 22 looking in the direction of the arrows.

The bracket 155 further comprises a depending section 155b which supports a fixed downwardly extending member 166 on which a member 167 is slidably mounted for movement in a vertical direction. The member 167 supports a horizontal pin 168 to which the inner ends of a pair of link members 169 and 170 are loosely pivoted, the link members 169 and 170 extending in opposite directions from each other.

The members 158, 159 carry the respective horizontal rods 171 and 172 on which the outer ends of the respective link members 169 and 170 are pivoted, the rods 171 and 172 at their free ends having the respective ends of a coil spring 173 connected thereto.

As shown in Figs. 24 and 25, the pivoted end of the member 158 is received within the fork-shaped pivoted end of the member 159. These pivoted ends of said members 158 and 159 are provided with two sets of shoulders 158a, 159a and 158b, 159b which are so arranged with respect to each other as to form stop surfaces. Thus, the shoulders 158a, 159a engage each other as shown in Fig. 25 to limit opening movement of the members 158, 159. The shoulders 158b, 159b are adapted to function similarly as regards closing movement of said members 158, 159. However, when a tubular article is between the channel member 164 and the head 165, the shoulders 158b, 159b are slightly spaced from each other and hence not in engagement.

Suitably secured to the member 158 is an arm 174 terminating in a split sleeve forming a support for a lateral pin 175 on which a roller 176 is freely rotatable.

Figures 21, 22:
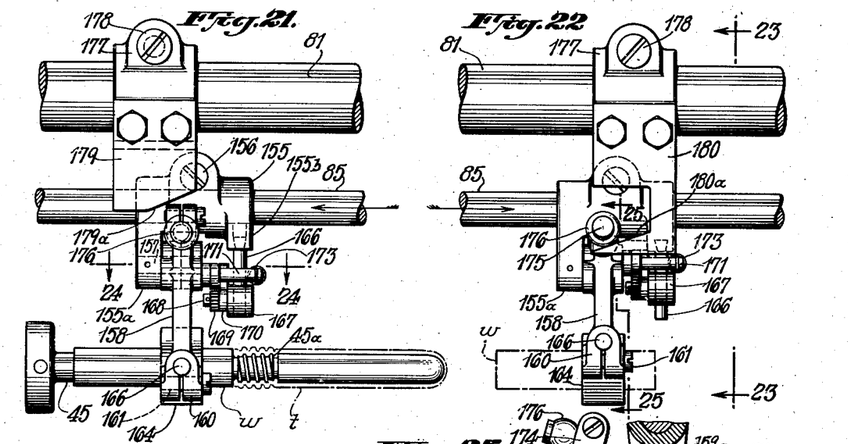
Figs. 21 and 22 are enlarged elevational views showing the arrangement for removing a tubular article from its supporting spindle in different respective positions thereof.

Referring to Figs. 1, 21 and 22, the member 81 is shown as having two split sleeves 177 secured thereto by the respective screws 178. Suitably secured to the sleeves 177 are the respective depending plates 179 and 180, the plate 179 comprising a cam surface 179a and the plate 180 comprising a cam surface 180a.

The arrangement described above as supported by the rod 85 and member 81 cooperates at the position R1 to remove a tubular waste section w from its spindle 45 while the latter remains stationary in said position R1. A duplicate arrangement having corresponding reference characters applied to the corresponding parts is supported by the rod 86 and member 82. This duplicate arrangement cooperates at the position R to remove a tubular threaded section t from its spindle 45 while the latter remains stationary in said position R.

After completion of the described cutting operation in the position C, the next step of movement of the disk 41 moves the spindle 45 carrying the severed sections t and w into the position R.

The rods 85 and 86 have been previous described as moving from their normal respective positions at the extreme right of Fig. 1 to their respective positions at the left of Fig. 1 and then back again, this occurring during each cycle of operation of the cam shaft 33. This operation was described in connection with the movement of a tubular article A onto an empty spindle 45.

As the rod 86 moves from right to left, Fig. 1, as described above, the members 158 and 159 are open with their stop surfaces 158a and 159a in engagement. Eventually, the rod 86 and the bracket 155 carried thereby reach a position wherein the channel member 164 and the head 165 are disposed at opposite respective sides of the threaded tubular section t as the latter rests on the spindle 45 in the position R. At this time, during continued slight movement of the rod 86 toward the left, Fig. 1, the cam roller 176 comes into engagement with the cam surface 179a of the plate 179 to thereby move the member 158 in a counter-clockwise direction, Fig. 25, on the pin 157. Movement of the member 158 as described is transmitted to the member 159 to produce simultaneous movement thereof in a counter-clockwise direction, Fig. 25, such simultaneous movement of the members 158, 159 toward closing position being controlled by the links 169 and 170, the member 167 sliding downwardly on the member 166 to accommodate movement of the links. During initial movement of the members 158 and 159 toward closed position, the spring 173 is expanded slightly and then moves below the center of the pin 157 forming the pivotal axis of said members 158 and 159 in toggle fashion whereby the threaded tubular section t is gripped between the channel member 164 and the head 165. Thereafter, the rod 86 moves toward the right, Fig. 1, and, eventually, the cam roller 176 comes into engagement with the cam surface 180a of the plate 180. When this happens, the member 158 is swung clockwise from the position shown in Fig. 20, the member 159 moving simultaneously in the opposite direction to thereby release the threaded tubular section t which drop, under the influence of gravity into a receptacle or the like, not shown. During the movement of the members 158 and 159 last described, the spring 173 moves, toggle fashion, above the center of the pin 157 to thereby hold said members 158 and 159 in open position.

Accordingly, in the manner described, the threaded tubular section t is removed from that spindle 45 occupying the position R. Simultaneously and in the same manner, by the described duplicate arrangement carried by the members 81 and rod 85, the tubular waste section w on the spindle 45 occupying the position R1 is removed and dropped into a receptacle, not shown.

Accordingly, in view of the foregoing description, it will be understood that the machine of my invention comprises a disk 41 which is movable step-by-step in an intermittent manner to position a given spindle 45 successively in a loading position L, a threading position T, a cutting position C, a first position R for removing the threaded tubular member t and a second position R1 for removing the second tubular member w. After the given spindle 45 leaves the position R1, it moves to an idler position I and then returns to the loading position L so as to receive another tubular article A. Each time that the disk 41 remains stationary for an interval, all of the spindles 45 are rotated although, as will be understood, such rotative movement is operatively required only for those spindles 45 which are in the threading and cutting positions. However, the fact that the spindles 45 are rotating, while in the loading and article-removing positions, is desirable because facilitating the ease with which the loading and removing operations is effected.

When the tubular articles A are formed from plastic material as hereinbefore described, the temperature thereof should be somewhat above room temperature during the threading operation. As representative of this, I have shown in Fig. 13 a tube 182 having its nozzle directed toward that part of the tubular article A which registers with the threading dies. Alternatively, the magazine 68 together with the trough or channel which receives individual tubular articles A from the magazine may have suitable heating elements, not shown, associated therewith whereby the temperature of the tubular articles are elevated to sufficient extent before they are loaded onto the spindles 45.

A feature of my invention resides in the fact that various parts of the machine herein disclosed are of such character that adjustment may be effected so that tubular articles A having various lengths may be loaded onto the spindles 45. In addition, the feeding, threading, cutting and article-removing mechanisms are of adjustable character so that threaded tubular sections t of a desired length may be produced.

It has been hereinbefore pointed out that the side wall 68c of the magazine 68 may be moved either toward or from the fixed side wall 68b so as to accommodate tubular articles A of a desired length in the receptacle 68. Dependent upon the length of the tubular articles A which are to be fed from the magazine 68, the bracket 98 of the pusher finger 98a may be moved to proper position on the pusher rod 97.

When it becomes desirable to manipulate tubular articles A having diameters improperly related to the spindle axis or to either increase or decrease the length of the final product, i. e., the threaded tubular sections t, another set of spindles 45 may be substituted for those in use, each spindle 45 of the substituted set of spindles having its threaded die section 45a located the proper distance from the spindle end. Alternatively, each spindle 45 may be so constructed that the part thereof to the right of the die section 45a, Fig. 12, is a detachable stem. Then, by associating a stem of proper length with the spindle proper, the tubular sections t may have such length as desired.

In accordance with the length of the selected spindles 45, the screws 4, which hold the standard 9 on the table 1, are loosened whereupon said standard 9 is moved in the proper direction longitudinally of said table 1 on its trackways 9a, Fig. 16, to position the respective cup-shaped members 124 approximately in proper operative relation with respect to the ends of those spindles 45 in the threading position T and the cutting position C, respectively. Thereupon, the screws 4 are passed into a pair of threaded openings and tightened to positively hold the standard 9 in the selected position. Close adjustment between said cup-shaped members 124 and the ends of the respective spindles 45 last named may be obtained by loosening the screws of the split sleeves 126a which secure the crosshead 126 to the respective rods 121 and 122, Figs. 16 and 17, moving said crosshead with respect to the rods and then tightening said screws. Or, close adjustment may be obtained by shifting the cam 131 in one direction or the other on the cam shaft 33.

Dependent upon the location of the threading dies 45a longitudinally of the respective spindles 45, the collars 100 and 100, Fig. 13, may be loosened to shift the entire assembly of the threading die 117 to the proper position longitudinally of the shaft 57. Then, after the cam 106 has been moved to proper operative position on the cam shaft 33, the threading die 117 is in condition for proper cooperation with the spindle threading dies 45a.

Dependent upon any new location of the threading dies, it will be understood that the cutting mechanism should partake of a corresponding adjustment. To this end, the screw 140, Fig. 16, may be retracted whereupon the bracket 139 together with the hub section 138 and cam lever 137 may be moved longitudinally of the supporting member 135 to the proper position therefor. Thereafter, the screw 140 is tightened to positively retain the cutting mechanism in its selected position.

It will be obvious that the position of the sets of cam plates 179 and 180 may be changed in position as desired to effect the closing and opening of the sets of members 159 and 159 by which the respective articles t and w are gripped and then removed from the spindles 45.

Although the invention has been described particularly with respect to a machine utilizable for a specific purpose, namely, threading, cutting and otherwise manipulating tubular articles, it shall be understood that the invention is not to be thus limited. Thus, for example, it will be understood that, as regards the disclosed Geneva movements, the "work" on the spindles may be of other character and manipulated otherwise than as hereinbefore described.

A feature of the invention of importance relates to the use of the two Geneva movements for stepping the disk 41 and, for rotating the spindles 45 while said disk 41 is stationary. The Geneva movement comprising the crank arm 28 and slotted disk 39 is of the "external" type and hence is of conventional construction. However, the Geneva movement comprising the crank arm 36 and slotted disk 52 is of the "internal" type and is particularly advantageous for effecting the desired rotation of the spindles 45 because the crank arm 36 is effective throughout an angle substantially in excess of 180 degrees whereas the crank arm 28 of the external type Geneva movement is necessarily effective throughout an angle of substantially less than 180 degrees.

It shall be understood that the machine herein disclosed may be modified in certain respects without affecting the broader principles of the invention. Thus, for example, I have disclosed an automatic mechanism for removing the tubular articles A from the magazine and for loading them onto the respective spindles 45 as the latter remain stationary in the loading position L. Under certain circumstances, it may be desirable to dispense with this automatic mechanism and provide an operator for loading the spindles manually. Further, I have disclosed two duplicate mechanisms for removing the tubular articles t and w in the positions R and R1. Under certain circumstances, it may be desirable to eliminate these automatic mechanisms and remove said tubular sections t and w by other equivalent mechanism or manually by an operator.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a machine of the character described, a shaft extending longitudinally of the machine, a disk carried by said shaft, spindles spaced around said disk circumferentially of said shaft, each of said spindles being adapted to have a tubular article disposed thereon in a loading position, means for intermittently rotating said shaft and disk to move the loaded spindles first to a threading position and then to a cutting position, threading mechanism in said threading position, cutting mechanism in said cutting position, and means comprising a Geneva movement mechanism for simultaneously rotating all of the spindles on said disk and for operating said threading and cutting mechanisms;

2. In a machine of the character described, a shaft extending longitudinally of the machine, a disk carried by said shaft, spindles spaced around said disk circumferentially of said shaft, each of said spindles being adapted to have a tubular article disposed thereon in a loading position, means comprising a Geneva movement mechanism for intermittently rotating said shaft and disk to move the loaded spindles first to a threading position and then to a cutting position, threading mechanism in said threading position, cutting mechanism in said cutting position, and means comprising a Geneva movement mechanism for simultaneously rotating said spindles and operating said threading and cutting mechanisms, the axes of said Geneva movement mechanisms coinciding with the axis of said shaft and the respective slotted disks of said mechanisms being rotatable in the same directions.

3. The combination with a shaft, a disk carried thereby, and a plurality of spindles carried by said disk circumferentially of said shaft, of means comprising a first Geneva movement mechanism for intermittently imparting steps of rotative movement to said shaft and disk, and means comprising a second Geneva movement mechanism for rotating all of said spindles during each period that the disk is stationary.

4. The combination with a shaft, a disk carried thereby, and a plurality of spindles carried by said disk circumferentially of said shaft, of means comprising a first Geneva movement mechanism for intermittently imparting steps of rotative movement to said shaft and disk, and means comprising a second Geneva movement mechanism for rotating all of said spindles during each period that the disk is stationary, the axes of said Geneva movement mechanisms coinciding with the axis of said shaft and the slotted disks of said mechanisms being rotatable in the same directions.

5. The combination with a shaft, a disk carried thereby, and a plurality of spindles carried by said disk circumferentially of said shaft, means comprising a first Geneva movement mechanism for intermittently imparting steps of rotative movement to said shaft and disk, and means comprising a second Geneva movement mechanism for rotating all of said spindles during each period that the disk is stationary, said second Geneva movement mechanism having its crank arm pivoted inwardly of the periphery of the slotted disk which cooperates therewith.

6. In a machine of the character described, a disk, means for intermittently imparting steps of rotative movement to said disk, a plurality of spaced spindles carried by said disk, each of said spindles, in a loading position, being adapted to have disposed thereon a cylindrical tube open at one end and closed at its other end by a semi-spherical integral section, means movable into engagement with the closed tube end and into supporting relation with respect to each spindle while the latter is in a threading position, and means for threading each tube while in said threading position in an area thereof intermediate its ends.

7. In a machine of the character described, a disk, means for intermittently imparting steps of rotative movement to said disk, a plurality of spaced spindles carried by said disk, each of said spindles, in a loading position, being adapted to have disposed thereon a cylindrical tube open at one end and closed at its other end by a semi-spherical integral section, means movable into engagement with the closed tube end and into supporting relation with respect to each spindle while the latter is in a cutting position, and means for severing each tube while in said cutting position along a line between the ends thereof.

8. In a machine of the character described, a disk, means for intermittently imparting steps of rotative movement to said disk, a plurality of spaced spindles carried by said disk, each of said spindles, in a loading position, being adapted to have disposed thereon a cylindrical tube open at one end and closed at its other end by a semi-spherical integral section, means movable into engagement with the closed tube end and into supporting relation with respect to each spindle while the latter is in a threading position, means for threading each tube while in said threading position in an area thereof intermediate its ends, means movable into engagement with the closed tube end and into supporting relation with respect to each spindle while the latter is in a cutting position, means for simultaneously actuating both of said movable means for the purposes specified, and means for severing each tube while in said cutting position along a line between the threaded section and the open end thereof.

9. In a machine of the character described, a disk, means for intermittently imparting steps of rotative movement to said disk, a plurality of spaced spindles carried by said disk, each of said spindles, in a loading position, being adapted to have disposed thereon a cylindrical tube open at one end and closed at its other end by a semi-spherical integral section, means movable into engagement with the closed tube end and into supporting relation with respect to each spindle while the latter is in a threading position, means for threading each tube while in said threading position in an area thereof intermediate its ends, means movable into engagement with the closed tube end and into supporting relation with respect to each spindle while the latter is in a cutting position, and means for simultaneously actuating both of said movable means for the purposes specified.

FREDERICK W. HILL.